US008811377B1

(12) United States Patent
Weston et al.

(10) Patent No.: US 8,811,377 B1
(45) Date of Patent: *Aug. 19, 2014

(54) APPARATUS AND METHOD FOR INSTRUMENTING DEVICES TO MEASURE POWER USAGE USING A MULTI-TIER WIRELESS NETWORK

(75) Inventors: Patrick E. Weston, Cameron Park, CA (US); Abraham D. Fechter, Cameron Park, CA (US); Yann T. Ramin, Folsom, CA (US); Rituparna Ghosh, Folsom, CA (US); Sean L. Bell, Granite Bay, CA (US); Seokman Paul Han, Rancho Cordova, CA (US); Raju Pandey, Davis, CA (US)

(73) Assignee: SynapSense Corporation, Folsom, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 12/807,234

(22) Filed: Aug. 30, 2010

(51) Int. Cl.
*H04L 12/28* (2006.01)

(52) U.S. Cl.
USPC ........ 370/351; 455/343.5; 455/572; 700/286; 700/295

(58) Field of Classification Search
None
See application file for complete search history.

(56) References Cited

U.S. PATENT DOCUMENTS

| 4,866,606 A | 9/1989 | Kopetz |
| 5,194,848 A | 3/1993 | Kerr |
| 5,379,290 A | 1/1995 | Kleijne |
| 5,408,506 A | 4/1995 | Mincher et al. |
| 5,515,369 A | 5/1996 | Flammer, III |
| 5,896,412 A | 4/1999 | Levanon |
| 6,028,857 A | 2/2000 | Poor |
| 6,208,247 B1 | 3/2001 | Agre |
| 6,304,556 B1 | 10/2001 | Haas |
| 6,404,756 B1 | 6/2002 | Whitehill |
| 6,442,596 B1 | 8/2002 | Dyer |
| 6,480,497 B1 | 11/2002 | Flammer, III |

(Continued)

FOREIGN PATENT DOCUMENTS

| CA | 2616715 | 2/2007 |
| CN | 101401480 | 4/2009 |

(Continued)

OTHER PUBLICATIONS

PCT International Search Report and Written Opinion, Feb. 28, 2012, PCT/US2011/049235.

(Continued)

*Primary Examiner* — Khoa Huynh
(74) *Attorney, Agent, or Firm* — Inventive Patent Law P.C.; Jim H. Salter

(57) ABSTRACT

Various embodiments provide an apparatus and method for instrumenting devices to measure power usage using a multi-tier wireless network. An example embodiment includes: establishing communication with a plurality of networked power monitors deployed at particular points in a facility, each power monitor of the plurality of networked power monitors being configured to monitor power consumption of a different one of a plurality of electronic devices in the facility; periodically obtaining system data from each of the plurality of networked power monitors using a wireless sensor network, the system data including power consumption data corresponding to associated electronic devices; using a communication hub to aggregate the system data from a plurality of associated power monitors, the communication hub and the plurality of associated power monitors forming a local network within the wireless sensor network; and using the system data to control operation of the plurality of electronic devices in the facility.

18 Claims, 7 Drawing Sheets

(56) References Cited

U.S. PATENT DOCUMENTS

| | | |
|---|---|---|
| 6,590,928 B1 | 7/2003 | Haartsen |
| 6,735,630 B1 | 5/2004 | Gelvin |
| 6,807,165 B2 | 10/2004 | Belcea |
| 6,850,502 B1 | 2/2005 | Kagan |
| 6,856,591 B1 | 2/2005 | Ma et al. |
| 6,859,831 B1 | 2/2005 | Gelvin |
| 7,010,392 B2 | 3/2006 | Bash |
| 7,020,701 B1 | 3/2006 | Gelvin |
| 7,031,329 B2 | 4/2006 | Lipsanen |
| 7,031,870 B2 | 4/2006 | Sharma |
| 7,086,603 B2 | 8/2006 | Bash |
| 7,119,676 B1 | 10/2006 | Silverstrim et al. |
| 7,176,808 B1 | 2/2007 | Broad |
| 7,180,915 B2 | 2/2007 | Beyer |
| 7,269,753 B2 | 9/2007 | Farkas et al. |
| 7,272,129 B2 | 9/2007 | Calcev |
| 7,277,414 B2 | 10/2007 | Younis et al. |
| 7,313,461 B2 | 12/2007 | Sharma et al. |
| 7,363,516 B2 | 4/2008 | Bresniker et al. |
| 7,386,743 B2 | 6/2008 | Bahali et al. |
| 7,421,599 B2 | 9/2008 | Bahali et al. |
| 7,436,789 B2 | 10/2008 | Caliskan et al. |
| 7,463,644 B2 | 12/2008 | Zhu |
| 7,467,311 B2 | 12/2008 | Bahali et al. |
| 7,502,360 B2 | 3/2009 | Liu |
| 7,509,506 B2 | 3/2009 | Bahali et al. |
| 7,633,882 B2 | 12/2009 | Das et al. |
| 7,680,092 B2 | 3/2010 | Van Laningham |
| 7,839,764 B2 | 11/2010 | Jiang et al. |
| 7,992,021 B2 | 8/2011 | Bahali et al. |
| 8,053,926 B2 | 11/2011 | Lehmann et al. |
| 8,108,703 B2 | 1/2012 | Bahali et al. |
| 8,212,395 B2 | 7/2012 | Jansma |
| 8,305,737 B2 | 11/2012 | Ewing et al. |
| 8,494,661 B2 | 7/2013 | Ewing et al. |
| 8,527,619 B2 | 9/2013 | Ewing et al. |
| 2002/0073152 A1 | 6/2002 | Andrew et al. |
| 2003/0067745 A1 | 4/2003 | Chandrakant |
| 2003/0067892 A1 | 4/2003 | Beyer |
| 2004/0090329 A1 | 5/2004 | Hitt |
| 2005/0024826 A1 | 2/2005 | Bash |
| 2005/0030968 A1 | 2/2005 | Rich et al. |
| 2005/0074025 A1 | 4/2005 | Shao et al. |
| 2005/0129051 A1 | 6/2005 | Zhu |
| 2005/0157698 A1 | 7/2005 | Park et al. |
| 2005/0173549 A1 | 8/2005 | Bash |
| 2005/0201340 A1 | 9/2005 | Wang |
| 2005/0213612 A1 | 9/2005 | Pister |
| 2005/0223090 A1 | 10/2005 | Ewing et al. |
| 2005/0237928 A1 | 10/2005 | Le Scolan et al. |
| 2005/0239411 A1 | 10/2005 | Hazra |
| 2006/0029060 A1 | 2/2006 | Pister |
| 2006/0029061 A1 | 2/2006 | Pister |
| 2006/0034191 A1 | 2/2006 | Sahinoglu |
| 2006/0126501 A1 | 6/2006 | Ramaswamy |
| 2006/0149408 A1 | 7/2006 | Speetzer |
| 2006/0161909 A1 | 7/2006 | Pandey |
| 2006/0164040 A1 | 7/2006 | Ohkubo |
| 2006/0198346 A1 | 9/2006 | Liu |
| 2006/0215581 A1 | 9/2006 | Castagnoli |
| 2006/0215583 A1 | 9/2006 | Castagnoli |
| 2006/0225446 A1 | 10/2006 | Bash |
| 2006/0245360 A1 | 11/2006 | Ensor et al. |
| 2006/0268791 A1 | 11/2006 | Cheng |
| 2006/0269028 A1 | 11/2006 | Bley |
| 2006/0282685 A1 | 12/2006 | Bahali et al. |
| 2006/0282687 A1 | 12/2006 | Bahali et al. |
| 2007/0005994 A1 | 1/2007 | Bahali et al. |
| 2007/0050523 A1 | 3/2007 | Emeott |
| 2007/0116060 A1 | 5/2007 | Qu |
| 2007/0143043 A1 | 6/2007 | Wafer et al. |
| 2007/0208992 A1 | 9/2007 | Koren |
| 2007/0211686 A1 | 9/2007 | Belcea |
| 2007/0258508 A1 | 11/2007 | Werb |
| 2007/0268880 A1 | 11/2007 | Bellur et al. |
| 2008/0008138 A1 | 1/2008 | Pun |
| 2008/0019265 A1 | 1/2008 | Alluisi et al. |
| 2008/0019302 A1 | 1/2008 | Nagarajan et al. |
| 2008/0043707 A1 | 2/2008 | Ren |
| 2008/0062003 A1 | 3/2008 | Paetz |
| 2008/0084294 A1 | 4/2008 | Zhiying et al. |
| 2008/0095222 A1 | 4/2008 | Van Laningham |
| 2008/0129495 A1 | 6/2008 | Hitt |
| 2008/0151801 A1 | 6/2008 | Mizuta |
| 2008/0174446 A1 | 7/2008 | Ghabra et al. |
| 2008/0215900 A1 | 9/2008 | Bahali et al. |
| 2008/0244281 A1 | 10/2008 | Felter et al. |
| 2008/0253327 A1 | 10/2008 | Kohvakka et al. |
| 2008/0269932 A1 | 10/2008 | Chardon |
| 2008/0298450 A1 | 12/2008 | Zhang |
| 2009/0007706 A1 | 1/2009 | Hitt et al. |
| 2009/0031051 A1 | 1/2009 | Nguyen |
| 2009/0031148 A1 | 1/2009 | Densham |
| 2009/0059814 A1 | 3/2009 | Nixon et al. |
| 2009/0062970 A1 | 3/2009 | Forbes et al. |
| 2009/0109992 A1 | 4/2009 | Lurie et al. |
| 2009/0168796 A1 | 7/2009 | Pandey et al. |
| 2009/0234512 A1 | 9/2009 | Ewing et al. |
| 2009/0243895 A1 | 10/2009 | Mitchell et al. |
| 2009/0289812 A1 | 11/2009 | Kim et al. |
| 2009/0302996 A1 | 12/2009 | Rhee et al. |
| 2009/0322518 A1 | 12/2009 | Liang et al. |
| 2010/0005331 A1 | 1/2010 | Somasundaram et al. |
| 2010/0008286 A1 | 1/2010 | Abedi |
| 2010/0042860 A1 | 2/2010 | Kwon et al. |
| 2010/0085903 A1* | 4/2010 | Pandey et al. ................. 370/311 |
| 2010/0127141 A1 | 5/2010 | Chan et al. |
| 2010/0142425 A1 | 6/2010 | Lee et al. |
| 2010/0148940 A1 | 6/2010 | Gelvin et al. |
| 2010/0164720 A1* | 7/2010 | Kore ................................ 340/541 |
| 2010/0177708 A1 | 7/2010 | Pandey et al. |
| 2010/0211669 A1 | 8/2010 | Dalgas et al. |
| 2010/0211810 A1 | 8/2010 | Zacho |
| 2010/0220653 A1 | 9/2010 | Hwang et al. |
| 2010/0235654 A1 | 9/2010 | Malik et al. |
| 2010/0280796 A1 | 11/2010 | Ramin et al. |
| 2010/0316009 A1 | 12/2010 | Han et al. |
| 2011/0072289 A1 | 3/2011 | Kato |
| 2011/0101777 A1 | 5/2011 | Jansma |
| 2011/0167280 A1 | 7/2011 | Ewing et al. |
| 2011/0205693 A1 | 8/2011 | Jansma et al. |
| 2011/0218689 A1* | 9/2011 | Chan et al. ...................... 700/295 |
| 2011/0245988 A1 | 10/2011 | Ingels et al. |
| 2011/0248823 A1 | 10/2011 | Silberbauer et al. |
| 2011/0291813 A1 | 12/2011 | Jansma |
| 2011/0320827 A1 | 12/2011 | Siegman et al. |
| 2011/0320849 A1 | 12/2011 | Cochran et al. |
| 2012/0011378 A1 | 1/2012 | Dalton et al. |
| 2012/0017102 A1 | 1/2012 | Turicchi et al. |
| 2012/0042180 A1 | 2/2012 | Ewing et al. |
| 2012/0054527 A1 | 3/2012 | Pfeifer et al. |
| 2012/0181869 A1 | 7/2012 | Chapel et al. |
| 2013/0191658 A1 | 7/2013 | Malik et al. |

FOREIGN PATENT DOCUMENTS

| | | |
|---|---|---|
| DE | 202006019810 | 5/2007 |
| EP | 1719301 | 11/2006 |
| EP | 1911184 | 4/2009 |
| JP | 2006311549 | 11/2006 |
| JP | 2009504010 | 6/2007 |
| JP | 2004336779 | 11/2007 |
| KR | 100646748 | 11/2006 |
| KR | 1020070009390 | 1/2007 |
| KR | 1020070105731 | 10/2007 |
| WO | WO2005083953 | 9/2005 |
| WO | WO2007015962 | 6/2007 |
| WO | WO2008021278 A3 | 7/2008 |
| WO | WO2010077253 | 7/2010 |
| WO | WO2010147622 | 12/2010 |

OTHER PUBLICATIONS

PCT International Preliminary Report on Patentability (PCT/US2010/001614), Dec. 16, 2011.

(56) References Cited

OTHER PUBLICATIONS

Kanzaki, Akimitsu et al.; Dynamic TDMA Slot Assignments in Ad Hoc Networks; 17th Int'l Conference on Advanced Information Networking and Applications; Mar. 2003; pp. 330-335.

Lee, Myung J. et al.; Emerging Standards for Wireless Mesh Technology; IEEE Wireless Communications; Apr. 2006; vol. 13; pp. 56-63.

Wei Li, et al.; Dynamic TDMA Slot Assignment Protocol for Multihop Ad Hoc Networks; Int'l Conference on Communication Technology; Nov. 2006; pp. 1-4.

C. Frank et al., Proceedings of the $3^{rd}$ International Conference on Embedded Networked Sensor Systems, pp. 230-242, 02-04; Nov. 2005.

PCT International Preliminary Report on Patentability, PCTUS2009/004508, Jul. 5, 2011.

Sensicast White Paper; 4 pages; Written by Nick Larkin, "Best Practices for Data Center Monitoring Using wireless Sensor Neworks"; 2007; printed from Internet on Oct. 23, 2011.

Public Announcement or Press Release entitled, "Seniscast Announces SensiNet Wireless Sensor Network Support for SNMP"; 3 pages; Nov. 6, 2007; published on www.marketwire.com; printed from Internet on Oct. 23, 2011.

\* cited by examiner

```
┌─────────────────────────────────────────────┐
│ Device Power Measurement Using Networked Power Monitors │
│                    -710-                    │
└─────────────────────────────────────────────┘
                       ▼
┌─────────────────────────────────────────────┐
│ Establish communication with a plurality of networked power │
│ monitors deployed at particular points in a facility, each power │
│ monitor of the plurality of networked power monitors being │
│ configured to monitor power consumption of a different one │
│ of a plurality of electronic devices in the facility. │
│                    -715-                    │
└─────────────────────────────────────────────┘
                       ▼
┌─────────────────────────────────────────────┐
│ Periodically obtain system data from each of the plurality of │
│ networked power monitors using a wireless sensor network, │
│ the system data including power consumption data │
│ corresponding to associated electronic devices. │
│                    -720-                    │
└─────────────────────────────────────────────┘
                       ▼
┌─────────────────────────────────────────────┐
│ Use a communication hub to aggregate the system data from a │
│ plurality of associated power monitors, the communication │
│ hub and the plurality of associated power monitors forming a │
│ local network within the wireless sensor network. │
│                    -725-                    │
└─────────────────────────────────────────────┘
                       ▼
┌─────────────────────────────────────────────┐
│ Use the system data to control operation of the plurality of │
│ electronic devices in the facility. │
│                    -730-                    │
└─────────────────────────────────────────────┘
                       ▼
                   ( End )
```

Figure 7

APPARATUS AND METHOD FOR INSTRUMENTING DEVICES TO MEASURE POWER USAGE USING A MULTI-TIER WIRELESS NETWORK

TECHNICAL FIELD

The disclosed subject matter relates to the field of device monitoring and control, and more particularly to power management of electronic devices.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009-2010 SynapSense Corporation, All Rights Reserved.

BACKGROUND

A data center can be modeled as rows of racks that house electronic systems, such as computing systems or other types of electrical devices. The computing systems (such as computers, storage devices, servers, routers, networking devices, etc.) consume power for their operation. The computing systems of the data center may reside in these racks. In a typical data center, there may be dozens or even hundreds of electrical devices. Each of these devices is connected to an electrical power source.

Data centers consume significant amounts of power, much of which is wasted in transmission and distribution, and over-cooling idle servers. Various studies have shown that about 35 W (watts) of electricity goes toward 1 W of actual work. In order to effectively utilize power in data centers and to ultimately reduce the overall power usage, it is critical to first understand how different data center equipment (e.g., servers, routers, storage equipment, cooling unit and power distribution units) consume power, and then to use the consumption information to optimize power usage.

The problem of measuring power consumption in data centers is complex for several reasons. First, the number of devices that consume power can be very large. Any solution will need to be cost effective and will need to apply to large as well as small data centers. Second, data centers use a variety of devices and mechanisms to deliver power. Any solution will need to address the heterogeneity and legacy issues in the data center. Finally, a large number of devices or systems in data centers can be idle or outdated. Some mechanism is needed to enable data center operators to remotely manage data center equipment and the power consumption of data center equipment.

Thus, an apparatus and method for instrumenting devices to measure power usage using a multi-tier wireless network are needed.

BRIEF DESCRIPTION OF THE DRAWINGS

The various embodiments are illustrated by way of example, and not by way of limitation, in the figures of the accompanying drawings in which:

FIG. 7 is a flow diagram illustrating the basic processing flow for a particular embodiment.

DETAILED DESCRIPTION

In the following detailed description, a reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is provided an apparatus and method for instrumenting devices to measure power usage using a multi-tier wireless network. A particular embodiment relates to a network of radio frequency (RF) devices (wireless nodes) that include one or more sensing devices capable of sensing various system conditions, including electrical power consumption. Then, using wireless data communications, the wireless nodes can communicate sensor information, system condition information including power consumption information, or network information with other nodes of the network or with a set of network controllers (e.g., gateways). The network and node configuration in a particular embodiment are described in more detail below.

The system and method of a particular embodiment involves deploying wireless sensor devices for collecting system information, including power consumption information, at different locations and levels in a data center or facility, and then using the system information to manage the consumption of electrical power within the data center.

Wireless mesh network technology can be used for deploying sensors as nodes in a variety of different environments for monitoring diverse parameters such as, for example, power consumption or power usage, temperature, pressure, humidity, airflow/fluid flow, the presence of moisture, the presence of smoke or fire, electrical current, power, air quality, air particle count, and the like. These types of networks can be denoted wireless sensor networks (WSN). Each sensor in a WSN is typically powered by a battery and therefore capable of operating in a wireless configuration. As described in more detail below, the sensors can constantly monitor a system and/or the environment for various system conditions and may communicate with other nodes and/or a network controller or gateway.

Figure 1:
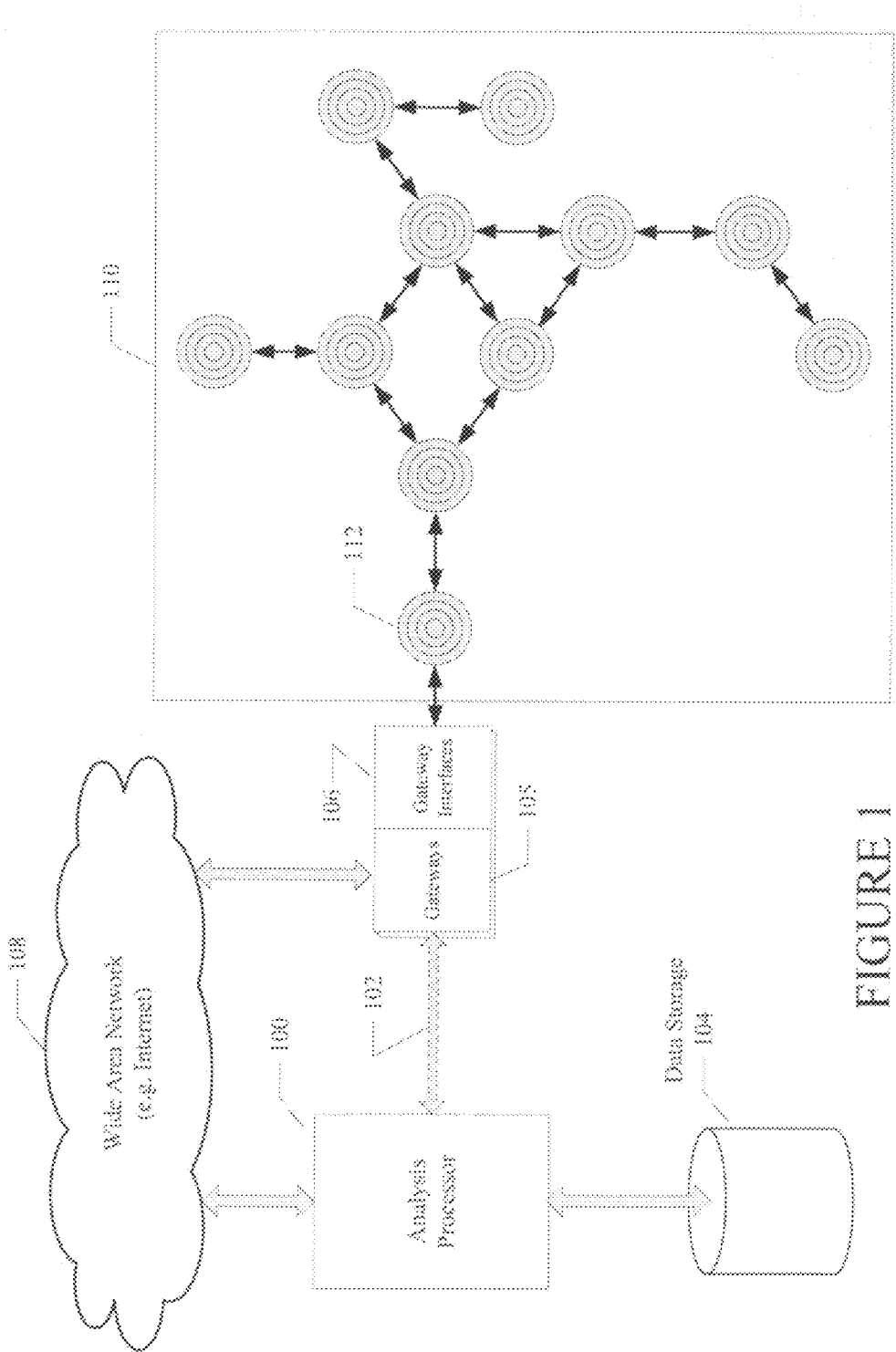
FIG. 1 illustrates a mesh network environment in which various embodiments can operate.

FIG. 1 illustrates a network environment of an example embodiment including a mesh network 110 of wireless sensors 112. Each of the sensors can be implemented as the combination of components illustrated in FIG. 2 and described in more detail below. Wireless sensor network (WSN) 110 includes a set of wireless sensors 112 (nodes), each in data communication with others of its proximate neighbor nodes. The nodes 112 can communicate using established data communication protocols, typically at the Media Access Control (MAC) Layer. The MAC Layer is one of two sub-layers that make up the Data Link Layer of the well-known OSI networking model. The MAC layer is responsible for moving data packets to and from the network interface of one node to another node across a shared channel. A node can be any vertex or intersection in the communication network 110. A node may be passive or intelligent. In a particular embodiment, a node is assumed to be an intelligent node capable of receiving and analyzing information, taking certain actions as a result of received information, including the storing of received or processed information, modifying at least part of received information, and in some instances originating and retransmitting information. The details of a node of a particular embodiment are detailed in FIG. 2.

Referring still to FIG. 1, data packets or messages can be directed between any two nodes of the WSN 110 as each node 112 has a unique identifier. A data packet or message is a self-contained unit of transmitted information. Typically, a data packet has a header, a payload, and an optional trailer. A link is a path which originates at one node and terminates at one other node. A link or path between nodes may include multiple hops between a plurality of intermediate nodes prior to reaching a destination node. The transfer of messages between two nodes of WSN 110 in a unicast or broadcast transmission is termed a local communication.

Each of the nodes 112 of WSN 110 can also communicate with a set of gateways 105 via a gateway interface 106. The gateway 105 provides a connection between the WSN 110 and an analysis processor 100. Analysis processor 100 can be used to receive sensor data from any of the nodes 112 of WSN 110 via gateway 105 and network 108 and to analyze the sensor data for aggregated system monitoring and control. Gateway 105 and analysis processor 100 can also each provide a connection to a wide area network 108, such as the Internet. In this manner, the analysis processor 100, the gateway 105, and the WSN 110 can obtain access to the Internet. Gateway 105 and analysis processor 100 can use a conventional data storage device 104 for data storage and retrieval. In some embodiments, an internal data connection 102 can be provided to link Gateway 105 and analysis processor 100 for data communications.

The WSN 110 can be configured in any of a variety of ways. Nodes 112 can be added, removed, or moved within the array of nodes of WSN 110. Each of the nodes 112 include functionality to join or reconfigure themselves in the WSN 110 when a node is added or moved. As part of this functionality, each node 112 can discover its neighbor nodes and automatically negotiate and establish communication paths with those neighbors. A node can be in direct data communication with neighbors that are within the radio reception range of the node. Depending on the strength of the wireless transceivers (e.g., radios) within each node 112, the distance between neighbor nodes is variable. Given that in some applications the environment in which WSN 110 is being used may be subject to radio interference, it is possible that the wireless data communications between nodes may be disrupted. In these cases, each node can sense the loss of data communications with a neighbor and may reconfigure itself to use alternate data paths through other functioning nodes of WSN 110. As such, the WSN 110 is highly adaptable to changing conditions in the environment and in the configuration of the wireless network.

Figure 2:
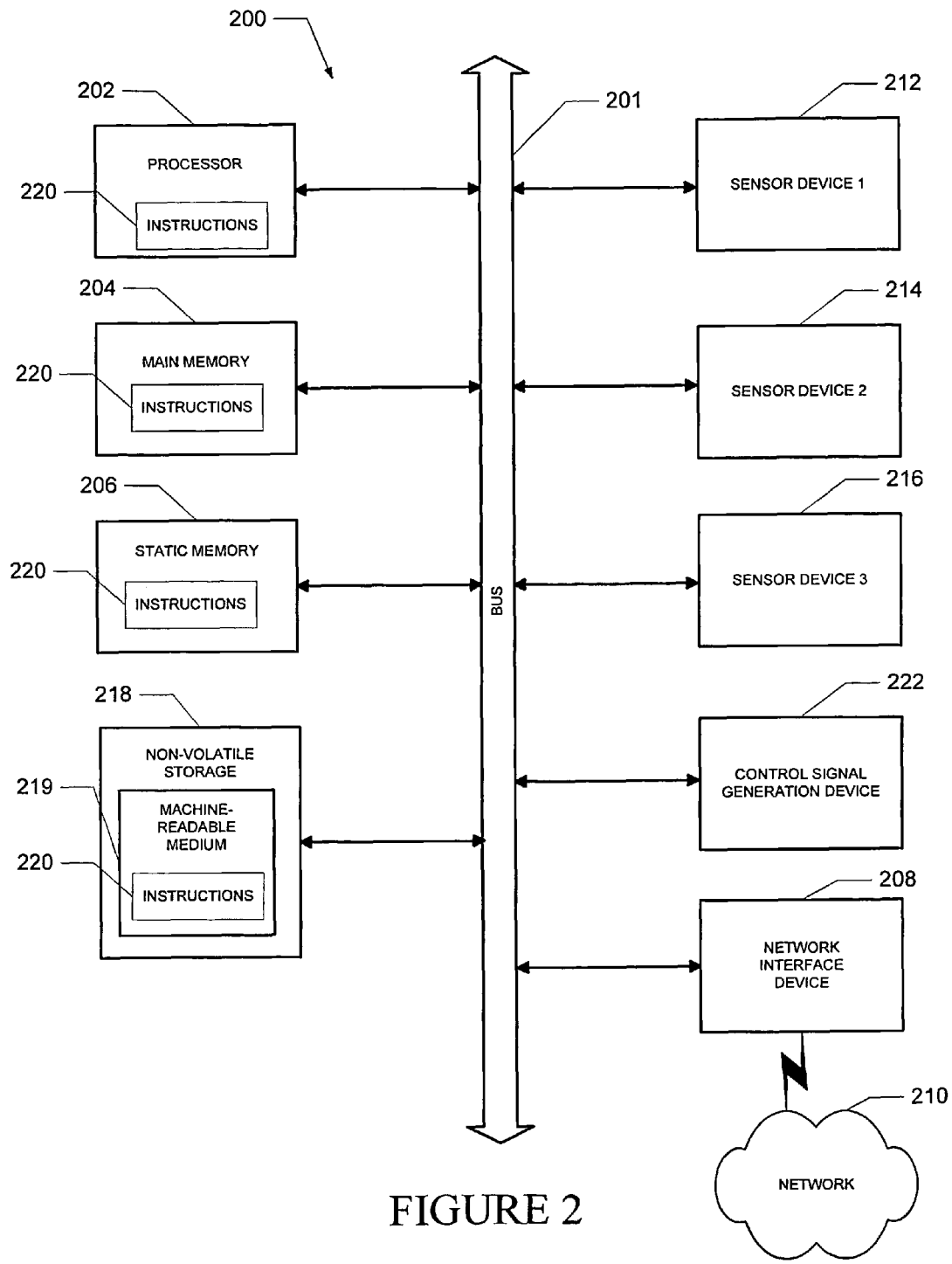
FIG. 2 illustrates an example embodiment of a node that can operate in a mesh network.

FIG. 2 shows a diagrammatic representation of a machine in the example form of a network node or sensor unit 200 within which a set of instructions, for causing the node to perform any one or more of the methodologies discussed herein, may be executed. In alternative embodiments, the node operates as a standalone device or may be connected (e.g., networked) to other machines. In a networked deployment, the node may operate in the capacity of a server or a client machine in client-server network environment, or as a peer machine in a peer-to-peer (or distributed) network environment, such as a mesh network. The node may be a computer, an intelligent sensor, a logic device, an application specific integrated circuit (ASIC), a field programmable gate array (FPGA), a hard-wired module, a network router, gateway, switch or bridge, or any machine capable of executing a set of instructions (sequential or otherwise) that specify actions to be taken by that machine. Further, while a single machine is illustrated in FIG. 2, the term "machine" or "node" shall also be taken to include any collection of machines that individually or jointly execute a set (or multiple sets) of instructions to perform any one or more of the methodologies discussed herein.

The example node 200 includes a processor 202 (e.g., a central processing unit (CPU)), a main memory 204 and optionally a static memory 206, which communicate with each other via a bus 201. The node 200 may further include one or more sensor devices 212, 214, and 216. These sensor devices can include power consumption or power usage sensors, voltage measurement devices, electrical current measurement devices, wattage measurement devices, inductance measurement devices, electromagnetic field (EMF) measurement devices, temperature sensors, humidity sensors, air pressure sensors, air flow sensors, moisture detectors, carbon monoxide detectors, fire/smoke detectors, motion detectors, seismic detectors, electrical current sensors, power sensors, air quality sensors, air particle count sensors, magnetic anomaly sensors, and/or other types of sensors for detecting and measuring a desired system or environmental condition.

The node 200 may further include a non-volatile memory 218, a control signal generation device 222, and a network interface device 208 (e.g., a radio transceiver or wireless device capable of connection with a network). The non-volatile memory 218 includes a machine-readable medium 219 in which is stored one or more sets of instructions (e.g., software and data 220) embodying any one or more of the methodologies or functions described herein. The instructions 220 may also reside, completely or partially, within the main memory 204, the static memory 206, and/or within the processor 202 during execution thereof by the node 200. The main memory 204, static memory 206, and the processor 202 also may constitute machine-readable media. The software, instructions, and/or related data 220 may further be transmitted or received over a network 210 via the network interface device 208. The network interface device 208, in a wireless node configuration of one embodiment, may include a radio transceiver for sending and receiving data to/from network 210 using a wireless data transfer protocol, such as the family of 802.11 standards from IEEE. In this manner, node 200 can perform wireless data communications with other nodes of WSN 110. The control signal generation device 222 can be used to control the operation of a management system, such as a power management system, electrical control unit, a heating/ventilating/air conditioning (HVAC) system, a fan, a heat pump, or other device or system that can alter the power consumption or environmental conditions being monitored by sensors 212, 214, and 216.

Gateway 105 can provide synchronization timing for the nodes 112 of WSN 110. Gateway 105 can send periodic messages to each of the nodes 112 of WSN 110. These periodic messages can include a timing signal (e.g. a beacon) to which each of the nodes 112 can synchronize their internal timers. Similarly, messages from gateway 105 to each of the nodes 112 can be used to provide system status, configuration, and control settings for the nodes of WSN 110.

As described herein, an apparatus and method for instrumenting devices to measure power usage using a multi-tier wireless network is disclosed. The apparatus and method in a particular embodiment include using a network of wireless sensors to monitor various system conditions, including power consumption, in specific devices of a data center over time and to generate control signals to manage power consumption and related conditions. Particular example embodiments are described in more detail below.

Figure 3:
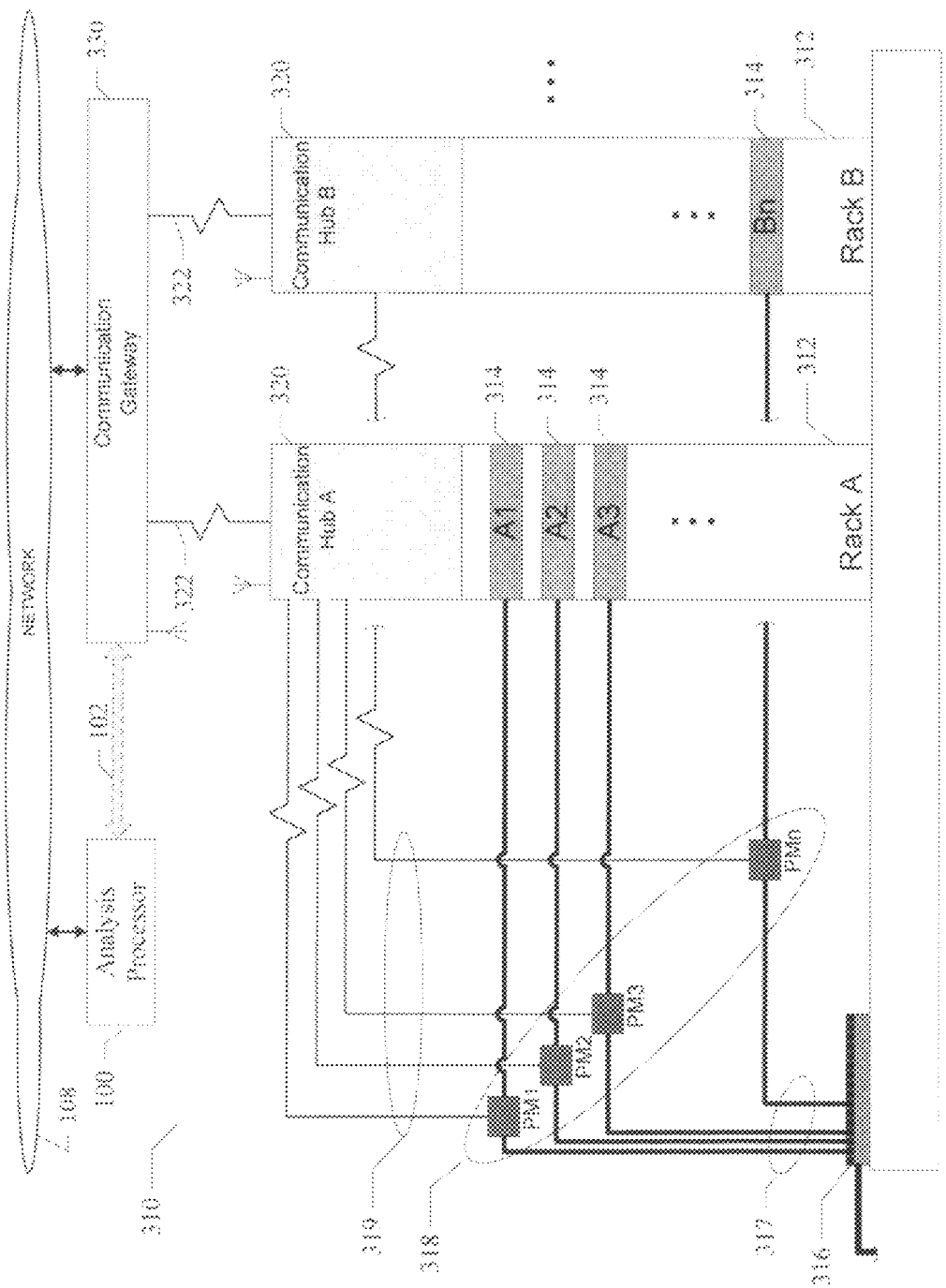
FIGS. 3 and 4 illustrate sample data center configurations of particular embodiments that include a set of racks that support stacked sets of electronic equipment, the power consumption of the electronic equipment being monitored and controlled by power monitors in mesh network communication with communication hubs and a communication gateway.

Referring now to FIG. 3, various example embodiments of the disclosed subject matter provide an apparatus and method for cost effective and efficient measuring of power usage (including current, power, power factor, energy, etc.) of different kinds of electrical equipment in a facility (e.g., a data center). In a particular embodiment, the system includes two sets of devices: (a) Power Monitors 318, and (b) Communication Hubs 320. A power monitor 318 (also denoted a Smart Plug (SP) herein) includes power measurement circuitry, a low cost microprocessor, a wireless radio and additional circuitry, as described below in connection with FIG. 6. Each power monitor 318 is connected to a different one of the electrical devices 314 and to a power strip 316 or other electrical power source via power cords 317. Upon connection, the power monitor 318 measures the electrical power consumed by the device 314 to which the power monitor 318 is connected. As shown in the example of FIG. 3, power monitor 318 devices PM1, PM2, PM3, and PMn, respectively, measure the power usage of electric devices (e.g., servers) A1, A2, A3, and Bn. Each power monitor 318 measures the electrical power consumed by the device 314 to which the power monitor 318 is connected and reports this power information as system data to a set of communication hubs 320 in wireless network data transmissions 319. The communication hub 320 can aggregate this system data and report the system data, including power consumption data, to a gateway 330 in wireless network data transmissions 322. The gateway 330 can then report the system data to an analysis processor 100 via a wide-area network 108 or via an internal data connection 102 in a particular embodiment.

FIG. 3 illustrates a data center configuration 310 of a particular embodiment that includes a set of racks 312 that support stacked sets of electronic equipment 314. In the illustrated example, wireless sensor devices 318 have been installed at various points proximate to racks 312. The wireless sensor devices 318 can be implemented as the devices illustrated in FIG. 2 and described above. As described above in connection with FIGS. 1 and 2, the wireless sensor devices 318 are wirelessly networked together in a network 110 (an example of which is shown in FIG. 1) and in data communications with a communication hub 320, gateway 330, and an analysis processor 100. Each of the sensors 318 can be configured to sense various system conditions, such as power usage (including current, power, power factor, energy, etc.) and the like. At a predetermined and configurable time interval, sensors 318 can measure the system conditions at each sensor location and retain the system data measurements along with a timestamp associated with each system data measurement. Using the data network 110, the sensors 318 can transmit time-stamped system data along with a sensor identifier to the analysis processor 100 for processing. The time-stamped system data can be sent to the analysis processor 100 via communication hub 320, gateway 330, and network 108. In this manner, the analysis processor 100 can collect the time-stamped system data from each of the sensors 318 installed in racks 312. It will be understood by those of ordinary skill in the art upon reading this patent disclosure that an arbitrary number of sensors 318 can be installed in the racks 312 in arbitrary positions within each rack of a particular data center. In general, the greater number of sensors 318 increases the ability for the system to detect more subtle changes in the system conditions within the data center as will be described in more detail below. The analysis processor 100 can use the system data to control operation of the plurality of electronic devices 314 in the facility.

Referring still to FIG. 3, each communication hub device 320 can receive data wirelessly from a number of power monitors 318. The communication hub 320 can then use a multi-hop mesh network (such as network 110) to send the data to the analysis processor 100 via gateway 330 for data processing. In a particular embodiment, power monitors 318 and communication hubs 320 cooperate in the following way to measure and communicate power usage information.

Each power monitor 318 is capable of sampling power usage data at a very high rate. After sampling the data, the power monitor 318 can perform computations to calculate different power related metrics. The power monitor 318 may also store the measured data and calculated metrics, generally denoted system data, in long-term data storage on the power monitor 318 device itself. Periodically, the power monitor 318 can send the calculated and measured system data to its primary communication hub 320. In one embodiment, the primary communication hub 320 can be the communication hub 320 associated with the rack 312 in which the monitored device 314 is installed. In other embodiments, the primary communication hub 320 can be the communication hub 320 associated with a particular one of the plurality of power monitors 318 at system initialization time. The primary communication hub 320 can collect data wirelessly from a plurality of associated power monitors 318. The communication hub 320 can aggregate the system data and use a multi-hop mesh network (such as network 110) to send the data to the analysis processor 100 via gateway 330 for data processing.

As shown in the example of FIG. 3, power monitors 318 (PM1, PM2, and PM3) measure power consumed by servers 314 (A1, A2, and A3 in Rack A), respectively. Power monitors 318 (PM1, PM2, and PM3) can then forward the measured power consumption information as system information to a primary communication hub 320 (e.g., Hub A). Similarly, power monitor 318 (PMn) can measure power consumed by server 314 (Bn in Rack B). Power monitor 318 (PMn) can then forward the measured power consumption information as system information to a primary communication hub 320 (e.g., Hub B).

Figure 4:
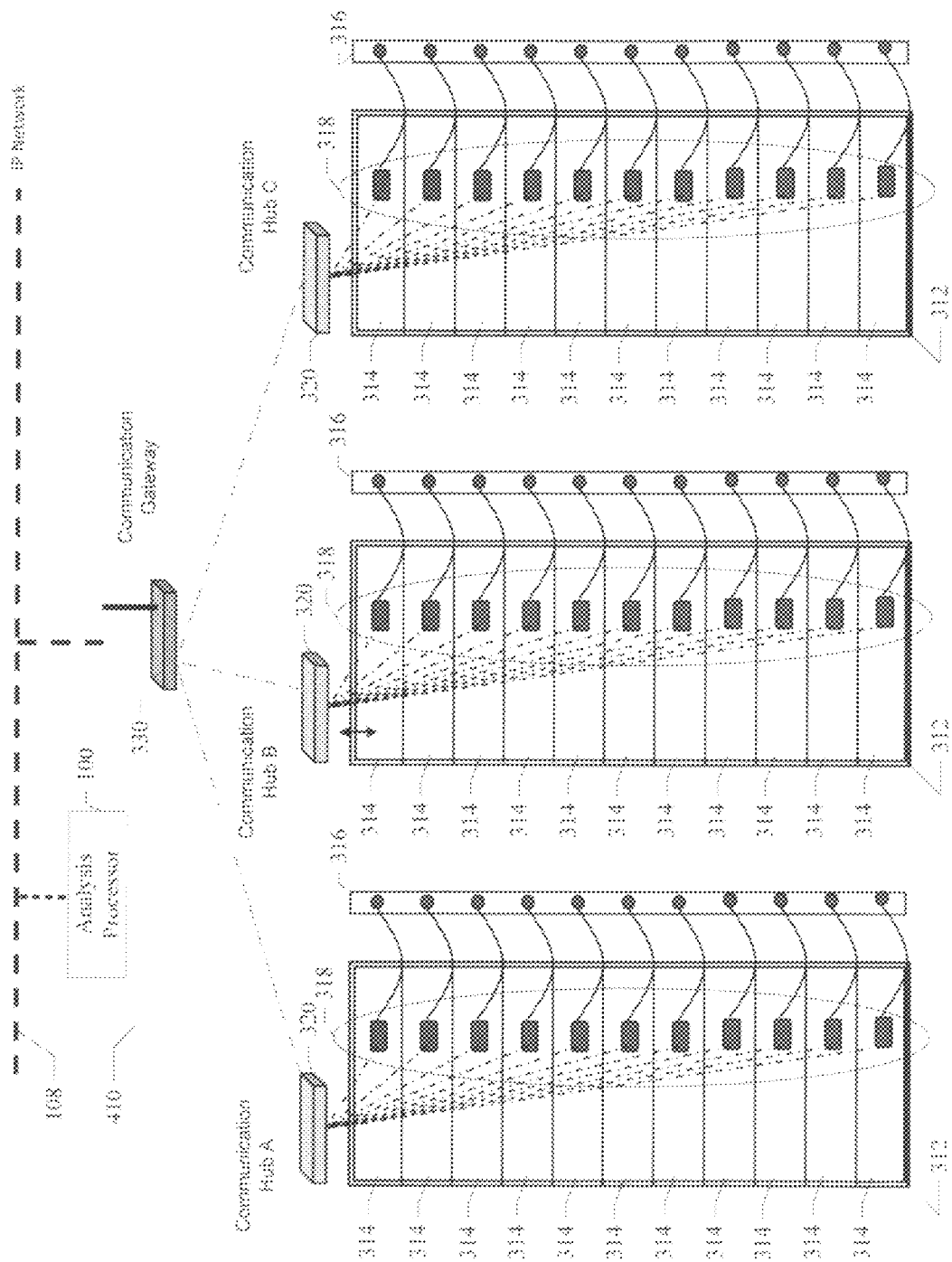

Referring now to FIG. 4, a data center configuration 410 of another embodiment includes a set of racks 312 that support stacked sets of electronic equipment 314. In the illustrated example, power monitors 318 have been installed with each of the electronic devices 314 residing in racks 312. The power monitors 318 are each coupled between a power source (e.g., an electrical power strip) 316 and a corresponding one of the electronic devices 314. As described above, each communication hub device 320 can receive system data, including power consumption data, wirelessly from a plurality of power monitors 318. The communication hub 320 can then use a multi-hop mesh network (such as network 110) to send the data to the analysis processor 100 via gateway 330 and network 108 for data processing.

Figure 5:
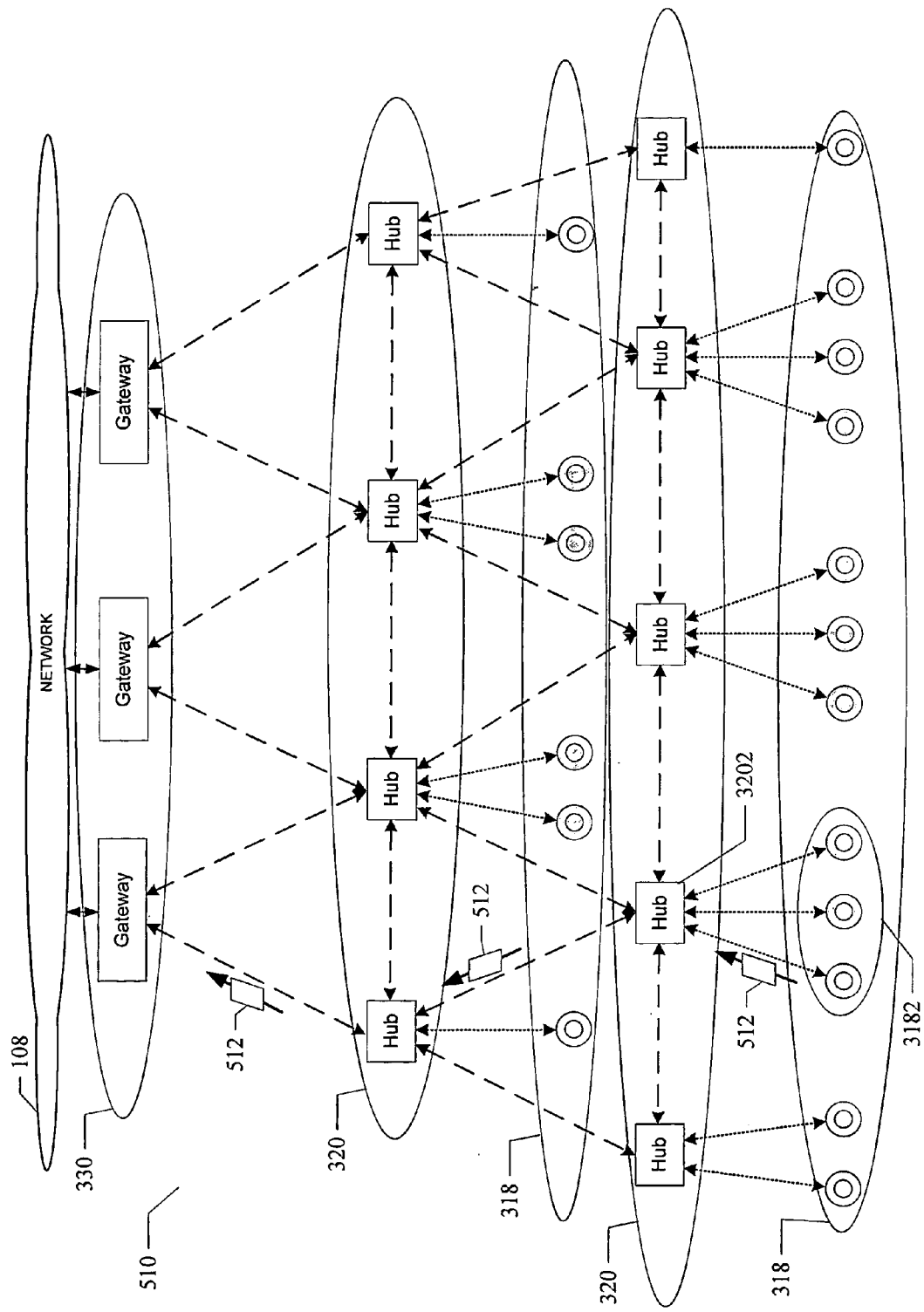
FIG. 5 illustrates a layout of an example data center in which an array of power monitors has been deployed.

Referring now to FIG. 5, a particular embodiment uses a multi-tier communication architecture for collecting and distributing information. As shown in FIG. 5, there are two networks: a local network (represented in FIG. 5 with dotted lines between sensor nodes 318 and communication hubs 320); and a global network (represented in FIG. 5 with dashed lines between communication hubs 320 and gateways 330). In a particular embodiment, the local network consists of a set of power monitors 318 and an associated primary communication hub 320. The local network is managed by the primary communication hub 320. The primary communication hub 320 is responsible for initiating, synchronizing, scheduling, and managing data communication in the local network. As shown in FIG. 5, data transfer in the local network takes place between power monitors 318 and the primary communication hub 320. As shown in FIG. 5, for example, power monitors 3182 form a local communication network with primary communication hub 3202. The primary communication hub 3202 manages the local network. Similarly, other collections of power monitors 318 form local networks with their corresponding primary communication hub 320.

In a particular embodiment, the global network is a multi-hop mesh network that integrates a plurality of communication hubs 320 with one or more gateways 330. An example embodiment is shown in FIG. 5. The global network is used to distribute system data that is collected by the power monitors 318 or other sensors that may be attached to the communication hubs 320. As shown in FIG. 5, a plurality of communication hubs 320 form a global network with one or more gateways 330. The global network is used to transfer system information to the gateways 330 in a multi-tiered communication architecture.

In an example embodiment, such as the example embodiment shown in FIG. 5, data transfer between network nodes (e.g., the power monitors 318, communication hubs 320, and gateways 330) takes place in two general phases: a data collection phase and a data aggregation phase. In the data collection phase, the power monitors 318 collect power related information (system data) periodically from the electronic devices 314 to which the power monitors 318 are connected. The power monitors 318 can aggregate this system data locally. At pre-configured intervals or upon request from another network device, the power monitors 318 can send the aggregated system data to their primary communication hub 320. In the data aggregation phase, the communication hubs 320 can collect aggregated system data from a plurality of power monitors 318. The communication hubs 320 can aggregate the collected system data. At pre-configured intervals or upon request from another network device, the communication hubs 320 can send the collected system data to the gateway 330 using the global network described above. An example of the routing of the system data is shown in FIG. 5 as a routing of a network data message 512 through the local and global networks as described herein.

FIG. 5 illustrates a layout of an example data center 510 in which an example array of power monitors 318 has been deployed. A typical deployment can include an array of networked devices (including power monitors 318, communication hubs 320, and gateways 330) in a distributed network architecture. In a particular example embodiment, the system described herein can include several kinds of devices, including wireless sensors, power monitors 318, communication hubs 320, gateways 330, routers, controllers, and the like that are distributed in the data center 510. FIG. 5 illustrates such an example system. Gateways 330 connect the power monitors 318 to a wide-area network 108, such as an Internet Protocol (IP) network including the Internet, via communication hubs 320. Gateways 330 typically have communication paths to all sensing and control devices in a particular system. Gateways 330 can send commands, status information, or data center relevant information to the other network devices (318 and 320).

In a particular embodiment, an example system can include a centralized software system, called the Analysis Processor 100 (shown in FIG. 1), which stores all of the sensing, control, and status information that is forwarded to the gateways 330 by the other network devices (318 and 320). The Analysis Processor 100 is primarily a repository of information and system-wide data processing for the system. In some embodiments, the Analysis Processor 100 can also control the electronic devices 314 in a particular facility in order to affect the overall power consumption of the facility. The power monitors 318, communication hubs 320, and gateways 330, denoted generally herein as the network devices, cooperate to establish a mesh data communications network that provides connectivity among the network devices.

Figure 6:
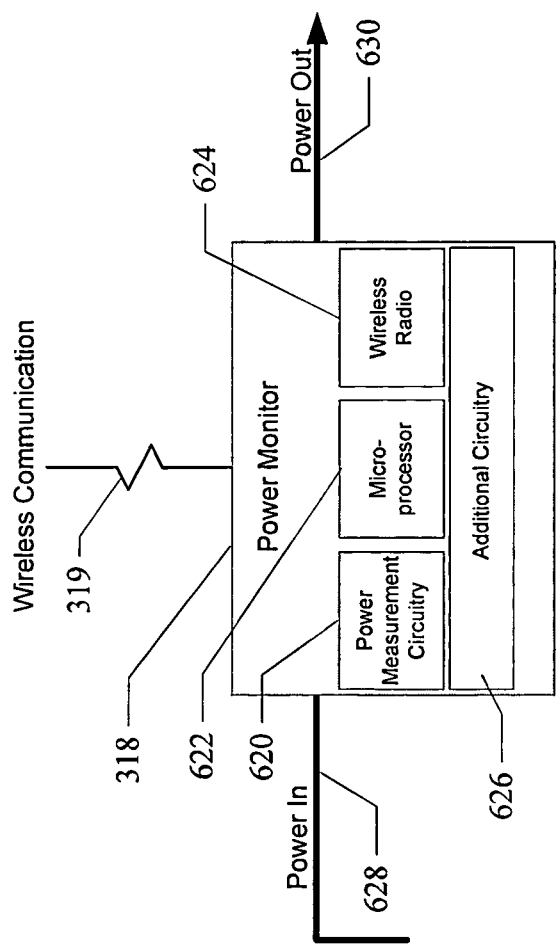
FIG. 6 illustrates an example embodiment of a power monitor device that can operate in a mesh network of various embodiments.

FIG. 6 illustrates an example embodiment of a power monitor 318 that can operate in a wireless sensor network of various embodiments. In a typical data center, electronic devices 314 (e.g., servers) residing in racks are typically powered via power cords or cables that attach to the electronic device 314 on one side and to a Power Distribution Unit (PDU) or power strips on another side. These power cables typically have C13 and C14 style power connector pairs. The power monitor 318 of an example embodiment includes a power cord that is similar in appearance and configuration to a standard electronic device 314 power cord, thus allowing the original power cord for a standard electronic device 314 to be replaced by a power monitor 318.

Referring to FIG. 6, a power monitor 318 of an example embodiment is shown to include power measurement circuitry 620, a low cost microprocessor 622, a wireless radio 624, and additional circuitry 626. A power monitor 318 is connected to a PDU, power strip 316, or other electrical power source via a power cord 628. The power monitor 318 is also coupled to an electronic device 314 via power cord 630. Upon connection, the power monitor 318 uses power measurement circuitry 620 to measure the electrical power consumed by the electronic device 314 to which the power monitor 318 is connected. The power monitor 318 can use its on-board microprocessor 622 and additional circuitry 626 to process the data corresponding to the measured electrical power consumed by the electronic device 314. For example, the power monitor 318 can produce metrics that can be derived from the measured electrical power data. These metrics are described in more detail below. These measured and computed metrics can be retained in a memory of the additional circuitry 626 and ultimately sent from the power monitor 318 by a local wireless network transmission to the communication hub 320 using the wireless radio 624 of the power monitor 318.

In one embodiment, the electronics that implement the power measurement and radio functions of the power monitor 318 are housed in a Poly Carbonate-acrylonitrile butadiene styrene (PC-ABS) plastic module attached to the cord 628/630. Each power monitor 318 has a unique identifier (ID) that is provided during manufacturing and is bar-coded on the outside of the device. As described above, each power monitor 318 includes power measurement circuitry 620, a microprocessor or central processing unit (CPU) 622, and a wireless radio 624. In order to calculate power usage, both voltage and current need to be sensed. In one embodiment, voltage sensing is accomplished via a potential divider chain placed across the live and neutral (phase to phase in a delta configuration) conductors; the junction of the divider is connected to the power circuitry's voltage analog/digital (A/D) converter input. Measuring the voltage drop across a current sensing resistor, utilizing the current A/D input to the power measurement circuitry 620, senses current. The power measurement circuitry 620 then calculates the power data taking into account PF (Power Factor). All four parameters, voltage, current, PF and power can be made available to an external device via a bus. These measured and computed metrics can be retained in a memory and ultimately sent from the power monitor 318 by a local wireless network transmission to the communication hub 320 using the wireless radio 624. The wireless radio 624 of a particular embodiment contains a 2.4 GHz ISM band transceiver and an embedded microcontroller 622. The network stack and data management firmware is housed in and executed by the microcontroller 622. An internal antenna supports the wireless radio 624. Power for the electronics of the power monitor 318 is scavenged from the power being monitored.

In an example embodiment, a communication hub 320 manages the local communication network that includes a set of power monitors 318. In addition, the communication hub 320 collects power data from the power monitors 318 and uses the global network to transmit the information to a centralized location for storage and processing. Communication hubs 320 can have a display to show current per phase and allow outlets to be selected during the installation process. Push buttons can be provided to set the mode of operation and provide installation functions. A serial port can be provided to attach a bar-code scanner during the installation process. The hardware architecture of a particular embodiment of the communication hub 320 includes a serial port to support the bar code scanner, an embedded 8-bit, 16-bit, or 32-bit processor, two radio devices, one for the local communication network, and another for the global communication network.

Before the power monitors 318 and communication hub 320 can be used, these devices need to be configured. In a particular embodiment, configuration involves associating a specific power monitor 318 with a set of communication hubs 320, and the outlet/equipment to which the power monitor 318 is attached. A configuration tool is used to record and store this information. In a particular embodiment, the configuration tool uses a process involving four steps: (i) Identification, (ii) Device and power monitor 318 association, (iii) Local Network Registration, and (iv) Router configuration. These steps are described in more detail below.

Identification involves collecting the unique identifier associated with each power monitor 318 and storing these identifiers with the configuration tool. This identification step can be achieved in one of the several ways:
- Manually read the unique bar code on each power monitor 318 and record the identifiers in the configuration tool.
- The configuration tool can include a bar code scanner, which is used to scan the bar code associated with each power monitor 318.
- The configuration tool can include a radio and may use the radio to directly communicate with the power monitor 318. Once the power monitor 318 is turned on (activated), the power monitor 318 can send its unique identifier to the configuration tool.
- The power monitor 318 can send its identifier to the communication hub 320, which then sends the identifier to the gateway 330. The configuration tool can download the unique identifier from the gateway 330 either through the network 108 or by connecting directly to the gateway 330 through a USB or serial port.

Every power monitor 318 can be associated with a device 314 or power outlet to which the power monitor 318 is attached. This association is used to determine which power monitor 318 is used to measure the power of which device 314. The process involves associating the identifier of a power monitor 318 with a unique identifier of the device 314 to which the power monitor 318 is attached. This association can take place in one of several ways:
- The configuration tool records the IP address of the device 314, and associates the device IP address with the identifier of the power monitor 318 being used to measure the power consumption of the device 314.
- The configuration tool can use a hardware identification number (such as the MAC ID) of the device 314 to associate the device 314 with the identifier of the power monitor 318 being used to measure the power consumption of the device 314.
- The configuration tool can use an absolute location (X, Y, Z) of the device 314 within a data center or a relative location (X, Y, Z) of the device 314 to associate the device 314 with the identifier of the power monitor 318 being used to measure the power consumption of the device 314.
- The configuration tool can use relative placement information corresponding to a placement of the device 314 within a specific location of a data center. For example, a server can be identified by the rack and the specific slot within the rack in which the server is placed. This relative placement information can be used to associate the device 314 with the identifier of the power monitor 318 being used to measure the power consumption of the device 314.
- The configuration tool uses an identifier (such as host name) assigned to each device 314, and associates this identifier with the identifier of the power monitor 318.

Local network registration in a particular embodiment involves creating a subnet that includes a set of power monitors 318. This subnet creation involves using the configuration tool to assign a unique identifier (subnet address) to each local network. The configuration tool may also assign a unique name or location to each subnet.

Finally, each local network is associated with a primary communication hub 320, which acts as a router and manager for the local network. Router (e.g., primary communication hub 320) configuration takes place in one of the several ways in various embodiments:
- The communication hub 320 is pre-loaded with the identifiers of the associated power monitors 318 and the corresponding local network identifier.
- The configuration tool uses the global network to download the corresponding local network identifier, and the identification number of each associated power monitor 318 to a communication hub 320.
- The configuration tool uses radio hardware to download the corresponding local network identifier, and associated power monitor 318 identifiers to a communication hub 320.
- The communication hub includes displays and user interfacing elements (such as touch interfaces and buttons). An installer uses these elements to key in the local network identifier and the identifiers of power monitors that are part of the specific local network.

The initialization phase involves the formation of the network in which both local and global networks are initialized. The techniques for building the global network are described above in relation to building the WSN 110. The method used for initialization of the local network in a particular embodiment is described next.

Once a power monitor 318 is turned on (activated), the power monitor 318 tries to connect with a communication hub 320 by sending beacons. A beacon is a data message sent via the wireless network. If there is no response from a communication hub 320, possibly because the communication hub 320 has not been turned on or the global network has not been formed, the power monitor 318 can: 1) sleep for some pre-configured length of time, 2) try sending the beacon again, or 3) choose a channel (e.g., a particular radio frequency band) on which the power monitor 318 can periodically request formation of the network.

If a communication hub 320 is active and the global network has been formed, the communication hub 320 can collect information related to the local networks that the communication hub 320 needs to support. The communication hub 320 can then monitor all channels on its secondary radio for request beacons from power monitors 318. Once the communication hub 320 receives a request beacon from a power monitor 318, the communication hub 320 can check its list of power monitors 318 that the communication hub 320 needs to support. If the requesting power monitor 318 is on the list of power monitors 318 that the communication hub 320 needs to support, the request from the power monitor 318 is verified. If the request is verified, the communication hub 320 can send a confirm message to the requesting power monitor 318. Once the communication hub 320 receives an acknowledgement from the requesting power monitor 318, a confirmation message is sent back to a network manager, which records the formation of the local network.

Another possible way in which a power monitor can become part of a local network is by sending request beacons to other power monitors that are already part of the network. In this approach, a power monitor sends beacons on a fixed number of channels. The power monitors that are already part of the local network monitor these channels for beacon messages. Once they receive request beacons, they forward the beacons to the associated communication hub. The communication hub responds to the requesting power monitor.

The various embodiments described herein provide a universal power monitoring system that allows for monitoring of power to individual electrical loads. Although various embodiments have application in several markets, a primary application is to measure the power usage of servers, routers, storage equipment, etc. within data centers. Certainly, the ability to accurately monitor power consumption at the server level can significantly reduce the frequency of power problems associated with power needs that exceed budgeted power. The various embodiments also enable data center operators to adequately budget for per-cabinet power usage.

The basic functionality of the various embodiments may be broken down into three primary parts: (a) per plug power usage data acquisition, (b) per cabinet data aggregation, and (c) data transmission. The idea for acquiring per-equipment power usage data is to augment the power cord to the load with a power monitoring capability. This is accomplished through the use of a power-sensing device that has compatible male and female power connectors, such as the power monitor 318 as described above. It is envisioned that each device to be monitored will be equipped with a power monitor 318.

By measuring power usage data at the plug-level, the power monitor 318 and communication hub 320 provides the ability to aggregate data to provide cabinet level metrics. Each power monitor 318 within a cabinet shall communicate its data to a local communication hub 320. The communication hub 320 may support power monitors 318 in multiple cabinets. The communication hub 320 bridges the wireless communications of the per plug power monitor 318 to the wireless network. The communication hub 320 also reports a power monitor 318 configuration to the server. This configuration information contains a mapping of power monitors 318 to outlets on the rack PDU. The communication hub 320 can have a display that provides visualization for total current, total kW, max current, and historical charting. The data is provided at phase-level per strip, per rack, in order to facilitate power load balancing. Each communication hub 320 can join the wireless network and report the measured and computed power data captured from each power monitor 318 via the WSN.

As described herein, the various embodiments enable several advantages. These advantages are summarized below:

The various embodiments provide a mechanism for separating the power measurement infrastructure from the communication infrastructure, and for combining the two infrastructure components in several ways. This enables aggregation of power measurement readings and their communication through a single network infrastructure.

The various embodiments use a low cost multi-hop wireless infrastructure for data distribution, which makes the power measurement infrastructure easier to deploy and integrate.

The various embodiments use a multi-level wireless network to collect power information and distribute the information to different nodes.

The various embodiments eliminate the need to wire the communication infrastructure.

The various embodiments provide techniques for configuring the power and communication network so that the apparatus can be used to provide power usage information at multiple levels.

FIG. 7 is a flow diagram illustrating the basic processing flow 710 for a particular embodiment. As shown, an example embodiment includes: establishing communication with a plurality of networked power monitors deployed at particular points in a facility, each power monitor of the plurality of networked power monitors being configured to monitor power consumption of a different one of a plurality of electronic devices in the facility (processing block 715); periodically obtaining system data from each of the plurality of networked power monitors using a wireless sensor network, the system data including power consumption data corresponding to associated electronic devices (processing block 720); using a communication hub to aggregate the system data from a plurality of associated power monitors, the communication hub and the plurality of associated power monitors forming a local network within the wireless sensor network (processing block 725); and using the system data to control operation of the plurality of electronic devices in the facility (processing block 730).

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a node configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations. Accordingly, the term "module" should be understood to encompass a functional entity, be that an entity that is physically constructed, permanently configured (e.g., hardwired) or temporarily configured (e.g., programmed) to operate in a certain manner and/or to perform certain operations described herein.

While the machine-readable medium 219 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or embodying a set of instructions for execution by the machine and that cause the machine to perform any one or more of the methodologies described herein. The term "machine-readable medium" shall accordingly be taken to include, but not be limited to, solid-state memories, optical media, and magnetic media.

As noted, the software and/or related data may be transmitted over a network using a transmission medium. The term "transmission medium" shall be taken to include any medium that is capable of storing, encoding or carrying instructions for transmission to and execution by the machine, and includes digital or analog communication signals or other intangible media to facilitate transmission and communication of such software and/or data.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, as described above, an apparatus and method for instrumenting devices to measure power usage using a multi-tier wireless network is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A method comprising:
    establishing communication with a plurality of networked power monitors deployed at particular points in a facility, each power monitor of the plurality of networked power monitors being configured to monitor power consumption of a different one of a plurality of electronic devices in the facility;
    associating a subset of the plurality of networked power monitors with a primary communication hub, the primary communication hub being configured as a node in a wireless sensor network;
    periodically obtaining system data from each of the plurality of networked power monitors using the wireless sensor network, the system data including power consumption data corresponding to associated electronic devices;
    routing the system data in messages between nodes of the wireless sensor network by transiting through at least one intermediate node of the wireless sensor network;
    using the primary communication hub to aggregate the system data from the subset of the plurality of networked power monitors, the primary communication hub and the subset of the plurality of networked power monitors forming a local network within the wireless sensor network;
    routing the system data in the wireless sensor network by transiting through the primary communication hub and at least one other communication hub of the wireless sensor network; and
    using the system data to control operation of the plurality of electronic devices in the facility.

2. The method as claimed in claim 1 wherein the system data includes measured power consumption data and computed power consumption data.

3. The method as claimed in claim 1 wherein the power consumption data includes voltage, electrical current, power, power factor, and energy data.

4. The method as claimed in claim 1 including routing the system data to a gateway.

5. The method as claimed in claim 1 including routing the system data to an IP network.

6. The method as claimed in claim 1 wherein each of the plurality of networked power monitors being configured to send a beacon to a corresponding communication hub on initialization.

7. An article of manufacture comprising a non-transitory machine-readable storage medium having machine executable instructions embedded thereon, which when executed by a machine, cause the machine to:
    establish communication with at plurality of networked power monitors deployed at particular points in a facility, each power monitor of the plurality of networked power monitors being configured to monitor power consumption of a different one of a plurality of electronic devices in the facility;
    associate a subset of the plurality of networked power monitors with a primary communication hub, the primary communication hub being configured as a node in a wireless sensor network;
    periodically obtain system data from each of the plurality of networked power monitors using the wireless sensor network, the system data including power consumption data corresponding to associated electronic devices;
    route the system data in messages between nodes of the wireless sensor network by transiting through at least one intermediate node of the wireless sensor network;
    use the primary communication hub to aggregate the system data from the subset of the plurality of networked power monitors, the primary communication hub and the subset of the plurality of networked power monitors forming a local network within the wireless sensor network;
    route the system data in the wireless sensor network by transiting through the primary communication hub and at least one other communication hub of the wireless sensor network; and
    use the system data to control operation of the plurality of electronic devices in the facility.

8. The article of manufacture as claimed in claim 7 wherein the system data includes measured power consumption data and computed power consumption data.

9. The article of manufacture as claimed in claim 7 wherein the power consumption data includes voltage, electrical current, power, power factor, and energy data.

10. The article of manufacture as claimed in claim 7 being further configured to route the system data to a gateway.

11. The article of manufacture as claimed in claim 7 being further configured to route the system data to an IP network.

12. The article of manufacture as claimed in claim 7 wherein each of the plurality of networked power monitors being configured to send a beacon to a corresponding communication huh on initialization.

13. A system comprising:
    an analysis processor in data communication via a wide-area network;
    a gateway in data communication via the wide-area network and a wireless sensor network;
    a primary communication hub in data communication via the wireless sensor network; and
    a plurality of networked power monitors deployed at particular points in a facility, each power monitor of the plurality of networked power monitors being configured to monitor power consumption of a different one of a plurality of electronic devices in the facility, a subset of the plurality of networked power monitors being associated with the primary communication hub, the primary communication hub being configured as a node in the wireless sensor network; the primary communication hub being configured to periodically obtain system data from associated power monitors of the plurality of networked power monitors using the wireless sensor network, the system data including power consumption data corresponding to associated electronic devices; the primary communication hub being configured to route the system data in messages between nodes of the wireless sensor network by transiting through at least one intermediate node of the wireless sensor network; the primary communication hub being configured to aggregate the system data from the associated power monitors, the primary communication hub and the associated power monitors forming a local network within the wireless sensor network, the primary communication hub being configured to route the system data in the wireless sensor network by transiting through the primary communication hub and at least one other communication hub of the wireless sensor network; and the analysis processor being configured to use the system data to control operation of the plurality of electronic devices in the facility.

14. The system as claimed in claim 13 wherein the system data includes measured power consumption data and computed power consumption data.

15. The system as claimed in claim 13 wherein the power consumption data includes voltage, electrical current, power, power factor, and energy data.

16. The system as claimed in claim 13 being further configured to route the system data to a gateway.

17. The system as claimed in claim 13 being further configured to route the system data to an IP network.

18. The system as claimed in claim 13 wherein each of the plurality of networked power monitors being configured to send a beacon to a corresponding communication hub on initialization.

* * * * *